United States Patent [19]

Fass et al.

[11] 4,179,130
[45] Dec. 18, 1979

[54] SEAL ASSEMBLY FOR TRACK-SEGMENT PIVOT

[75] Inventors: Carl Fass, Ennepetal; Hansjoachim Brunn, Damme, both of Fed. Rep. of Germany

[73] Assignee: Firma Intertrac Viehmann & Co., Gevelsberg, Fed. Rep. of Germany

[21] Appl. No.: 914,083

[22] Filed: Jun. 9, 1978

[30] Foreign Application Priority Data

Feb. 25, 1978 [DE] Fed. Rep. of Germany ....... 2808159

[51] Int. Cl.² .............................................. F16J 15/34
[52] U.S. Cl. ........................................ 277/84; 277/92; 305/11
[58] Field of Search ............. 277/63, 84, 92, 94, 277/95, 153; 305/11, 12

[56] References Cited

U.S. PATENT DOCUMENTS

| | | | |
|---|---|---|---|
| 2,326,489 | 8/1943 | Payne | 277/84 X |
| 2,368,611 | 1/1945 | Charnock | 305/11 X |
| 2,411,214 | 11/1946 | Keech | 305/11 X |
| 2,927,830 | 3/1960 | Workman | 277/63 X |
| 3,493,645 | 2/1970 | Sanderson et al. | 277/153 X |
| 3,511,511 | 5/1970 | Voitik | 277/84 X |
| 3,614,113 | 10/1971 | Burk | 305/11 X |
| 3,664,675 | 5/1972 | Malmstrom | 277/84 |
| 4,030,730 | 6/1977 | Maguire | 277/92 |
| 4,062,550 | 12/1977 | Satsumabayashi et al. | 277/92 |

*Primary Examiner*—Robert S. Ward, Jr.
*Attorney, Agent, or Firm*—Karl F. Ross

[57] ABSTRACT

A seal assembly for the pivot of a track of a tracklaying vehicle comprises an annular U-section nonmetallic and elastomeric seal and a metallic load ring received in the groove formed between the sides of the seal which bear in turn on a pair of axially confronting flanks of a pair of relatively pivotal members each belonging to a respective track segment. The metallic load ring has a pair of sides each bearing axially against a respective surface of a respective side of the seal and is received between the sides of the seal. This load ring may be of U-section, or may be constituted by a pair of oppositely dished metal washers.

4 Claims, 5 Drawing Figures

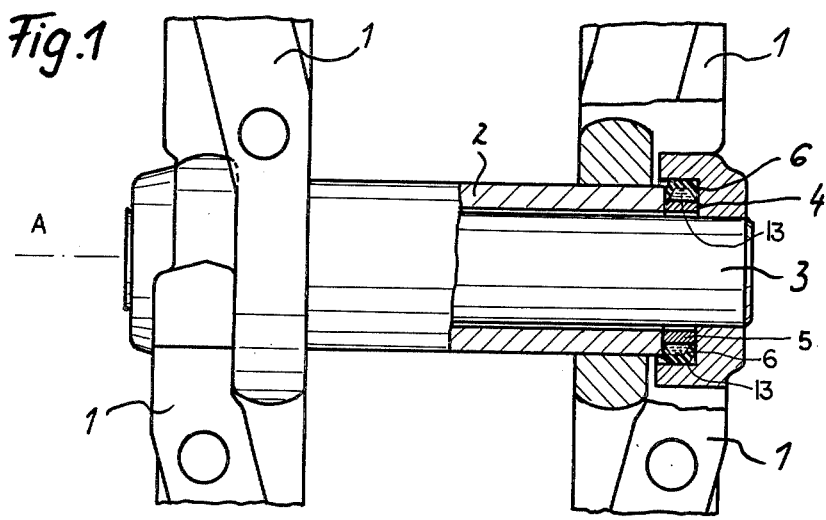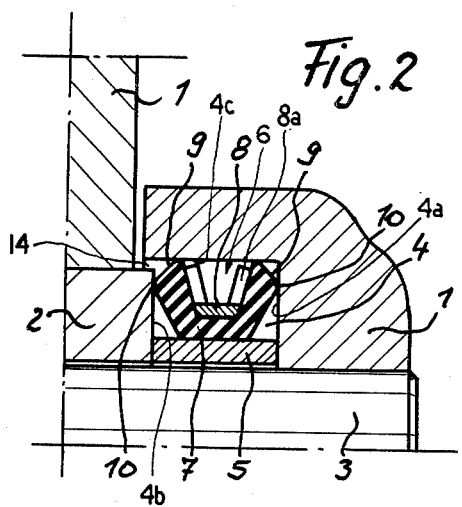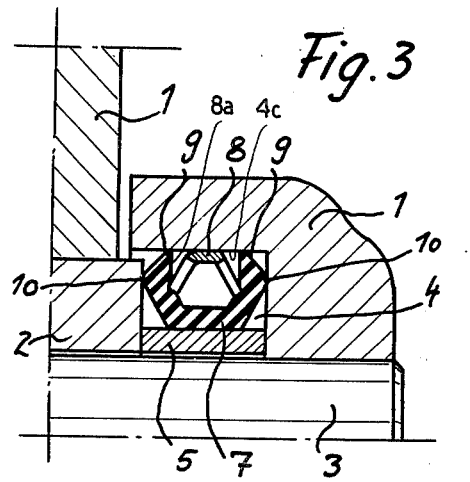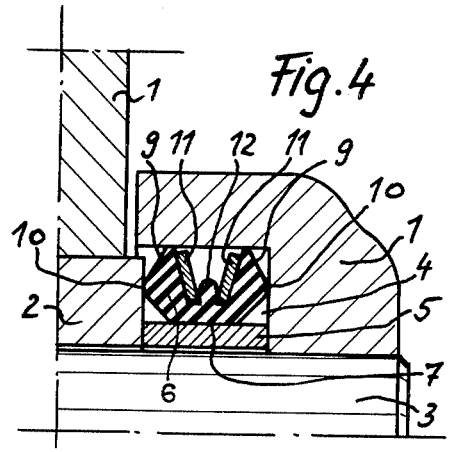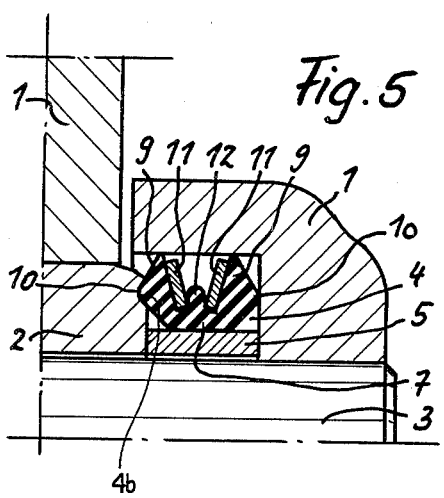

SEAL ASSEMBLY FOR TRACK-SEGMENT PIVOT

FIELD OF THE INVENTION

The present invention relates to a seal assembly. More particularly this invention concerns such a seal assembly usable at the pivots between the sections of track of a tracklaying vehicle.

BACKGROUND OF THE INVENTION

The segments of track of a tracklaying vehicle are pivoted together at pivots each formed by a pin having ends force-fitted into one of the segments and passing through a guide or sleeve secured to the other segment, normally also by force-fitting. It is necessary to lubricate and protect the contacting surfaces of each of these pivots, so a seal is normally provided between the member constituted by the one segment and the relatively rotatable or pivotable member constituted by the adjacent track segment at each pivot.

To this end as described in U.S. Pat. No. 4,030,730 an outwardly open groove is formed at each of these pivots and a U-section seal is fitted therein. In order to insure good contact between each side of the seal and the respective flank of the groove it is known to provide a solid-section nonmetallic and elastomeric load ring between the sides of the seal.

Such an arrangement works satisfactorily at normal operating temperatures. When the temperature rises above or falls below a relatively limited range, however, the effectiveness of the elastomeric load ring drops considerably. In the high temperature range the load ring becomes very soft and is almost completely ineffective to press the sides of the seal against the flanks of the groove, and in the low temperature range the elasticity of the load ring declines considerably so that its effectiveness is also reduced. What is more, the provision of such a massive load ring inside the seal limits the amount of fluid lubricant, normally grease, which the joint can be packed with. Thus it is difficult to provide a large quantity of grease at this very critical region which is exposed to very severe treatment as it forms the most roughly used portion of the tracklaying vehicle.

OBJECTS OF THE INVENTION

It is therefore an object of the present invention to provide an improved seal assembly for a track of a tracklaying vehicle.

Another object of the invention is to provide such an assembly which is usable over a wider temperature range than the known assembly for the same purpose.

Another object is the provision of such loaded seal assembly which can be packed with a large quantity of lubricant.

SUMMARY OF THE INVENTION

These objects are attained according to the present invention in a seal assembly of the above-described general type, but wherein the load ring is metallic and has a pair of axially oppositely directed ends bearing on the seal and pressing the sides thereof into snug axial contact with the respective flanks of the groove receiving the seal. The load ring does not completely fill the space between the flanks so as to leave room for a body of lubricant.

The arrangement according to the instant invention can therefore be used over a wide temperature range, from −60 degrees C. to plus 200 degrees C. In this very wide range the spring constant of the load ring, normally made of spring steel, is virtually constant so that adequate and uniform biasing of the sides of the seal against the flanks of the groove is insured.

According to other features of this invention the load ring is of U-section and has a pair of legs each forming a respective one of the sides. This U-section load ring may be opened inwardly or outwardly and the legs may be radially slotted for maximum springiness.

It is also within the scope of this invention to form the load ring of a pair of separate and axially spaced dished washers each lying flatly against the inside of a respective side of the seal ring. To this end the seal is formed at the base of the annular outwardly open recess receiving the two-part load ring with a ridge between the two oppositely dished washers. In such an arrangement a relatively large mass of lubricant can be held between the washers. As the operating temperature increases and the seal becomes softer, as is usual for most elastomeric materials, the mass of lubricant will swell thermally and press the sides of the seal against the flanks of the groove.

BRIEF DESCRIPTION OF THE DRAWING

FIG. 1 is a side view partly in section of a first seal according to this invention;
FIG. 2 is a large-scale view of a detail of FIG. 1; and
FIGS. 3, 4, and 5 are views similar to FIG. 2 showing further seals in accordance with the instant invention.

SPECIFIC DESCRIPTION

As shown in FIGS. 1 and 2 a tracklaying vehicle carries a track in turn formed of a succession of segments each defined by a pair of links 1 interconnected for relative pivoting about an axis A by means of a coaxial sleeve 2 in which is rotatably received a pin 3. The ends of the sleeve 2 are force-fitted with corresponding cylindrical bores in the ends of the links 1 of one segment and the ends of the pin 3 are similarly force-fitted in the ends of links 1 of the adjacent segment. A track block (not shown) is secured between each link 1 and each adjacent link 1.

As shown in better detail in FIG. 2 the link 1 of one track segment has an inwardly directed annular and planar surface 4a forming with an outwardly directed surface 4b of the sleeve 2 of the adjacent segment a cylindrical outwardly open groove 4. In addition a short sleeve 5 forms the base of this groove and is received with play about the pin 3. This groove 4 is closed externally by a surface 4c of the respective link 1, with only a small gap 14 being left.

Inside the groove 4 there is provided a U-section seal 6 having a base 7 and a pair of sides 9, the latter each resting and bearing axially against a respective one of the surfaces 4a and 4b. A spring-steel load ring 8 lies inside the seal 6 and has a pair of slotted legs 8a which lie flatly against the inside of the sides 9 of the seal 6 and press them against the flanks 4a and 4b of the groove 4. These sides 9 do not contact the surfaces 4a and 4b slightly, but bear in approximate line contact by edges or corners 10 against these surfaces 4a and 4b. The legs 8a are shorter than the corresponding surfaces of the sides 9 so that the load ring 8 lies wholly out of contact with any member other than the seal 6.

FIG. 3 shows how the load ring 8 can be reversed so as to open radially inwardly. In this arrangement the free ends of the legs 8a dig into the inner surfaces of the sides 9, and the base of the U-section ring 8 whose legs 8a lie generally at 45° to each other bears axially outwardly against the surface 4c.

In FIG. 4 the ring 8 is replaced by a pair of dished washers 11 which lie flatly against the inner surfaces of the sides 9 and which are separated by a radially outwardly projecting ridge 12 formed on the seal 6. These rings 11 exclusively contact the seal ring 6.

The assembly of FIG. 5 is identical to that of FIG. 4 except that the wall 4b is formed with an axially open groove 4b' receiving the corresponding edge 10 of the respective side 9. It is within the scope of the invention similarly to form the flank 4a.

As shown in FIG. 1 it is possible to pack the space between the sides 9 with a body 13 of lubricant, here grease. Such packing insures an excellent seal and long-term lubrication of the joint. In particular at high temperature, when the ring 6 becomes softer, the thermal expansion of the mass 13 will force its edges 10 into excellent contact with the flanks 4a and 4b.

It is understood that any of the features of any of the embodiments can be combined with any of the features of any of the other embodiments.

We claim:

1. A seal assembly comprising:
    a pair of members relatively rotatable about an axis and together forming a radially outwardly opening groove having a pair of axially confronting flanks:
    an annular nonmetallic and elastomeric seal in said groove having a pair of sides each engageable with a respective one of said flanks, formed between said sides with a radially outwardly open recess having a pair of axially confronting inner surfaces, and formed between said surfaces in said recess with a radially outwardly projecting ridge;
    a pair of similar load-ring forming and oppositely directed dished washers spaced axially from each other in said recess and both bearing on said ridge, each washer lying flatly against the respective surface and being dished away from the other washer for pressing the respective sides of said seal into snug axial contact with the respective flanks of said groove.

2. The assembly defined in claim 1 wherein said washers are radially slotted.

3. The assembly defined in claim 1, wherein said washers are made of spring steel.

4. The assembly defined in claim 1, further comprising a mass of fluent lubricant in said recess between said inner surfaces.